Patented Oct. 28, 1941

2,260,826

UNITED STATES PATENT OFFICE 2,260,826

PROCESS FOR PREPARING IMPROVED PIGMENT MATERIALS

James E. Booge, Wilmington, Del., assignor to E. I. du Pont de Nemours & Company, Wilmington, Del., a corporation of Delaware No Drawing. Application November 4, 1939, Serial No. 302,855

4 Claims. (Cl. 82—94)

This invention relates to the production of finely divided pigment materials. More particularly it relates to the production of white pigment materials comprising wet ground calcium carbonate. Still more particularly it relates to the production of white pigment materials comprising titanium dioxide and wet ground calcium carbonate of natural origin.

The wet grinding of calcium carbonate minerals such as chalk, limestone, marble, etc., is known to those acquainted with the art of manufacturing whiting. It, is, however, not nearly as common as dry grinding methods, doubtless on account of the added cost of drying the wet ground material. Whiting is useful in the preparation of putty and as a filler for paper, rubber, and the like, and also as an extender material for paints. Most commercial whiting has been considered sufficiently fine if about 98% of it will pass a 325 mesh screen. This fineness can be accomplished by dry grinding but when a finer product is desired it is usually necessary to employ wet grinding. Even the commercial wet ground products often show about 1 to 2% coarser than 325 mesh. This coarseness is apparently permitted by the product specifications rather than a limit of the wet grinding method since laboratory wet grinds have yielded products much lower in these coarse particles.

The use of commercial whitings for extenders in preparing paints is well known. The ground products find application in flat paints where the surface of the coating is not so sensitive to the coarse particles as a glossy film. A good grade of whiting having only 0.5% plus 325 mesh has enough coarse particles to impart a rough or gritty surface to the paint film. To obtain a first class gloss paint essentially none of the particles should be greater than 6 microns in diameter. Calcium carbonates of particle size less than 6 microns can be made by precipitation methods and these products are known as precipitated whitings. But, while their grit characteristics do not interfere with film gloss they have oil absorption values too high for good extender material running 25 percent and higher. The most suitable gloss extenders should have an oil absorption between about 15% and 20% of the weight of solids.

Recently new centrifugal methods for sizing fine solids suspended in liquids have become commercially available. The machines have been improved so they will continuously classify a suspension separating it into a coarse and fine fraction and continuously discharge both fractions. These devices are well suited for the preparation of pigment materials particularly because of their ability to handle concentrated slurries and effect a size separation without the use of dispersing agents. They have been used, for instance, to separate clay suspensions into a number of size fractions by passing the suspension through several centrifuges in series at different rates or by reclassifying the two first fractions by successive passes through the same machine operating under varied conditions. In these fractionating processes only a portion of the product is obtained which complies with a given size range specification. Consequently, when a fine product is desired there is a coarse fraction to be discarded.

This invention has as an object the production of finely divided pigment materials. A further object is the preparation of calcium carbonate pigment extender material suitable for incorporation in gloss paints. A still further object is the preparation of improved extenders by closed circuit wet grinding and centrifugal classification of naturally occurring calcium carbonate materials. A still further object is the preparation of calcium carbonate from the various natural sources such as limestone, chalk, marl, calcite, calspar, and other calcareous deposits in such a way that the product is substantially all in the crystalline form known as calcite. A still further object is the preparation of a composite pigment of excellent whiteness comprising a prime pigment and calcium carbonate. A still further object is the reduction in particle size of calcium carbonate. Additional objects will become apparent from an examination of the following description and claims.

These objects are attained according to the herein described invention which broadly comprises subjecting calcium carbonate having a power reflectance in white light of not less than 90% of that for freshly fumed magnesium oxide, such as that produced in accordance with the process disclosed in the co-pending application of Ray L. McCleary, Serial No. 262,184, to the steps of wet grinding in closed circuit with a continuous centrifugal classifier, blending with a prime pigment, dewatering, drying, and disintegrating.

In a more restricted embodiment this invention comprises subjecting calcium carbonate raw material of less than about 4 mesh size and having a powder reflectance in white light of not less than 90% of that for freshly fumed magnesium oxide to the steps of wet grinding in a closed circuit with a continuous centrifugal classifier.

blending with a prime pigment, dewatering, drying, and disintegrating.

A preferred embodiment of this invention comprises subjecting minus about 4 mesh white calcium carbonate material, such as calcite, calspar, marble, chalk, etc., comprising at least 98% of calcium carbonate by weight and having a white light reflectance of at least 90% of that for freshly fumed magnesium oxide to the steps of wet ball mill grinding in a closed circuit with a continuous centrifugal classifier, blending with pigment grade titanium oxide, dewatering, drying, and disintegrating, said blending step being controlled to give a dried composite pigment comprising not more than 35% nor less than 25% by weight of titanium dioxide, said calcium carbonate proportion of the product being substantially all in the crystal form of calcite.

In the specified steps of wet grinding in closed circuit with a continuous centrifuge, blending with a prime pigment, dewatering, drying, and disintegration, the blending step may be employed either before the grinding step or following it. In the former case, the desired amounts of the prime pigment, e. g., calcined $TiO_2$ and minus 4 mesh calcium carbonate raw extender material are fed to the grinding mill along with enough water to facilitate good grinding; both components are thus ground and classified together. When the prime pigment is already available as a finely ground product the blending step may be carried out using the fine calcium carbonate suspension discharged from the centrifuge.

This invention may be more readily understood from an examination of the following examples which are given for illustrative purposes and are not intended to place any restrictions or limitations on the herein described invention.

EXAMPLE I

*Grinding followed by blending*

Calcite rock running about 99.3% calcium carbonate was crushed in a hammer mill to pass a 4 mesh screen. A 5½' x 16' ball mill containing a normal charge of flint pebbles was charged with water and this −4 mesh calcite to give a slurry concentration of 500 grams of solids per liter. The ball mill was then operated until the solid particles were essentially reduced below 325 mesh. Continuous operation was then set up by feeding the ball mill discharge plus an additional equal amount of water (giving 250 grams solids per liter) to an 18" continuous centrifuge operating at 1200 R. P. M. through a feed orifice ¾ inch in diameter. The coarse product delivered from the centrifuge was recirculated to the ball mill and the addition of water to the ball mill controlled to maintain a slurry concentration of 500 grams solids per liter in the mill. The temperature of the slurry in the mill was about 50° C. The fine solids were discharged from the centrifuge at the rate of 250 lbs. per hour so the feed rate of −4 mesh rock was also maintained at 250 lbs. per hour. Examination of the fines by elutriation showed 98.7 weight percent of the particles to be 6 microns or less in diameter. The slurry of fines was collected and blended with calcined ground titanium dioxide. After thorough mixing the composite suspension was filtered and dried. The dried pigment was then passed through a micropulverizer to break up the lumps formed during the drying step. The dried disintegrated product contained 29.25% by weight of $TiO_2$ and was found to be an excellent pigment by a study of its properties as listed.

Oil absorption _____ 14.5
Tinting strength _____ 205
Color (whiteness) _____ 16

When incorporated in a linseed oil paint and applied the resulting film had excellent gloss and was free of gritty particles.

EXAMPLE II

*Blending followed by grinding*

Minus 4 mesh calcite rock was prepared as in Example I and mixed in a dry blending machine with calcined titanium dioxide. The weight ratio of calcite rock to titanium dioxide was 70/30. The closed circuit grinding and classifying system used in Example I was employed again and when equilibrium conditions were obtained the ratio of calcite to titanium dioxide in the fine product was also 70/30. The fine solids were collected, filtered, dried, and disintegrated. Pigment tests showed:

Oil absorption _____ 15
Tinting strength _____ 210
Color _____ 16

This product was also very well suited for the preparation of gloss paints.

In order to give a clearer understanding of the process and materials involved, the various tests employed will be briefly described.

*Reflectance.*—This factor is usually measured relative to the reflectance of light from a standard freshly fumed magnesium oxide surface. Powder reflectance refers to reflection from a compact surface of the finely powdered material. The powdered sample may be compressed by a glass plate into a circular glass well 1½ inches by 1 mm. deep to give a suitable surface. The surface thus prepared is compared with the standard MgO by means of the recording spectrophotometer described by A. C. Hardy in the Journal of the Optical Society of America, vol. 25, pages 305 to 311, September, 1935. From the spectrophotometric data thus obtained the relative brightness in white light of the standard and the sample may be computed. I find that in order to obtain satisfactory whiteness in my improved product the raw materials used are limited to those showing a reflectance of at least 90% of that for the standard MgO.

*Oil absorption.*—The weight in grams of linseed oil required to wet 100 grams of pigment is called its oil absorption. The method of testing is described on pages 540–541 of the 8th (Jan., 1937) edition of "Physical and Chemical Examination of Paints, Varnishes, Lacquers, and Colors," by Henry A. Gardner.

*Color.*—In white pigments the color is the apparent whiteness of an oil paste of a pigment relative to a standard sample similarly prepared and expressed in units on an arbitrary scale. The minimum perceptible difference is regarded as one point of color but a bluish cast is favored while yellowish tints are penalized. The details of the procedure are described by J. E. Booge and H. E. Eastlack in "Paints, Oil, and Chemical Review," April 9, 1924. A grading of 16 on the scale used represents excellent whiteness, while 12 is barely within the white pigment classification.

*Tinting strength.*—This test is designed to measure the ability of a pigment, in this case a white pigment, to cover or lighten the tint of a colored pigment when both are mixed together in an oil paste. The test is described in "Paint, Oil, and Chemical Review," April 16, 1924, by J. E. Booge and H. E. Eastlack. The tinting strength of a pigment is a good indication of its hiding power in glossy oil paint films. The best composite pigments comprising fine precipitated extenders and 30% of $TiO_2$ have tinting strengths of about 205 on the scale used in evaluating the products of this invention.

It is to be understood that the specific embodiments of this invention may be subjected to variation and modification without departing from the spirit and scope thereof. For example, a certain amount of variation in the operation of the closed circuit grinding system may be employed to modify the product. Thus, the capacity of the mill may be increased while other variables are held constant in order to increase the proportion of fine material and hence, increase the oil absorption of the product. It is sometimes desirable to have an oil absorption as high as 20 for pigments used in gloss paints. In all cases, however, the classification is made to keep the product of 6 micron size or finer.

While white calcite is readily available and gives an excellent product when processed according to this invention, it is to be understood that I may employ other forms of natural calcium carbonate such as chalk, marl, marble, limestone, and the like. When forms other than calcite are employed, e. g., amorphous deposits of biological origin, or aragonite, I have found it desirable to maintain the temperature of the grinding slurry between about 30° C. and about 65° C., preferably between about 50° C. and about 55° C., in order to effect the conversion of the calcium carbonate to the stable form of crystalline calcite.

While I have found it desirable to employ titanium dioxide as my prime pigment it is to be understood that this invention is not limited thereto since it contemplates the employment of all prime pigments, e. g., zinc sulfide, calcium titanate, barium titanate, magnesium titanate, and the like.

Although I am limited to the use of a raw material having a reflectance of 90% or better relative to MgO, I may improve the color of some minerals to meet this specification by various suitable methods such as crushing and washing, heating to destroy organic matter, flotation processes and various other means employed in the art of ore dressing.

In preparing glossy paint films it is necessary to guard against the presence of pigment particles large enough to break the smooth mirror-like surface of the film. I have found that particles greater than 6 microns in diameter tend to protrude from the oil surface resulting in a flat or gritty appearance. The pigment prepared according to this invention will not interfere with the glossy character of the paint film.

Another necessary property of a true gloss paint pigment is rather low oil absorption lying below about 20. Fine precipitated extenders generally have a high oil absorption and due to this oil demand, paints made from them do not have a high gloss desirable in enamel paints. This lack of gloss is not due to the coarseness of the pigment but is due to the high oil absorption characteristic which leaves no excess of oil to flow evenly over the surface of the paint film. The prerequisites for a gloss paint pigment are, therefore, a maximum particle size of 6 microns and an oil absorption below about 20.

An interesting feature of maintaining the temperature of the grinding slurry above about 30° C. is the conversion of other forms of calcium carbonate to calcite. Apparently calcite is the most stable form of calcium carbonate even at very low temperatures. However, due to the various conditions of its formation in nature, it may be in other crystal forms or amorphous as it is in some biological deposits and these unstable forms persist for years in the massive state. However, the action of the grind which is a combination of elevated temperature and pressure on the solid particles effects a transformation to the calcite structure. Of the chief crystalline forms of calcium carbonate, calcite has the lowest specific gravity and lowest refractive index. Both these features are desirable in extender materials. Once the calcium carbonate is in the form of calcite there is no danger of further change occurring.

When calcined titanium dioxide, which is usually in the form of pebble-like lumps, is mixed with the minus 4 mesh mineral and subjected to the preferred process of closed circuit grinding and classification a fortunate series of phenomena occur. The lumps of $TiO_2$ are rather loosely held groups of very fine particles which disperse rapidly under the action of the ball mill to particles most of which will be less than about 2 microns in diameter. Meanwhile, the calcium carbonate granules are grinding at a slower rate but eventually all are below 7 microns. In the classifier the calcite particles greater than 6 microns are returned for further grinding while, due to the greater specific gravity of the $TiO_2$ particles, the largest ones to pass to the fine fraction are only about 4.5 microns in diameter. The result is, therefore, a composite containing calcite ranging downward from 6 microns and $TiO_2$ ranging downward from 4.5 microns with the bulk of the particles (due to the easy grinding characteristics) lying in the very fine range. This is exactly the results desired for a gloss paint pigment, the prime component being fine and, therefore, developing high hiding power while the extender component is coarse enough to provide the correct oil absorption and yet no oversize or gritty material escapes into the product.

Attention is called to the fact that in the examples contained herein dilution of the mill slurry is made prior to its passage through the centrifugal classifier. I have found that the optimum concentration for wet milling is considerably greater than the optimum concentration for passage through the centrifugal classifier. The examples specify 500 grams of solids per liter in the ball mill and this should be regulated between the concentrations at 450 and 550 grams of solids per liter. The mill discharge should be diluted to about ½ this concentration or to between about 225 grams and about 275 grams of solids per liter after which it is centrifugally classified. This is especially important in connection with the operation which comprises the mixing or blending of titanium oxide calciner discharge with natural occurring calcium carbonate materials prior to the grinding and classification operation. Within these concentrations the two materials seem to have a grinding action upon each other that cannot be realized outside of this range. The titanium oxide as discharged from the calciner is made up of coarse lumps which are porous due to the sintering conditions prevailing during the high temperature calcination of the product. The calcium carbonate material, on the other hand, is a mineral material fundamentally soft even though it is in coarser solid condition than the prime pigment material. In the grinding concentrations specified above the presence of the titanium dioxide seems to assist in the grinding of the calicum carbonate and the calcium carbonate seems to assist in the grinding of the prime white pigment which in this instance is titanium oxide. Similar results are expected when other calcined prime pigments are substituted for titanium oxide.

The grinding of the two ingredients outlined above provides an easy method of producing the low oil absorption, high hiding power extended calcium carbonate pigment which is so desirable for use in gloss paints. While the calcium carbonate material is being ground to less than 6 microns in size the titanium oxide is being made finer and finer and this is not due to the grinding action of the balls in the mill alone, but also to the grinding action of the particles of calcium carbonate material on each other and on the $TiO_2$. In this manner the titanium oxide is ground to the point where very few particles in excess of about 1 micron in diameter exist and to the point where it exhibits maximum hiding power. At the same time a calcium carbonate material is ground only to the point where it is sufficiently fine for use in enamel films and yet remains in the low oil absorption range. The passage of the ground slurry through the centrifugal classifier then produces the extended pigment having an oil absorption below about 20 and substantially free of particles having a size greater than 6 microns. These properties have been found to be most easily produced by following the grinding conditions outlined above.

The pigment prepared by this process finds use in many of the pigment fields including paint, felt base coatings, paper, rubber, etc. In the paint field particularly it is especially adapted to use in glass paints of high quality. Prepared as it is without the use of water soluble dispersing and flocculating agents, it is practically free of cemented agglomerates which form when pigment materials are dried in the presence of sodium silicate, etc. This pigment is readily wet with most vehicles and consequently works into a smooth grit free paint with a minimum of mixing or grinding.

The process is particularly useful in the co-grinding and classification of calcium carbonate and calcined titanium dioxide as already pointed out.

This invention possesses certain advantages over other methods for preparing and compounding calcium carbonate pigments.

1. The use of the centrifuge permits the handling of concentrated slurries without the use of dispersing agents. Consequently, the space requirements and equipment size is considerably less than processes using settling tanks.

2. The elimination of dispersing agents reduces the cost of the product as well as yielding technical advantages already mentioned.

3. The co-grinding and classification of the prime pigment with the extender is also advantageous. In the first place, it provides an excellent and thorough blending of the two components resulting in greater uniformity and possibly greater hiding power. Secondly, it makes a single process out of two similar steps in as much as the prime pigment, particularly $TiO_2$, has to be ground and classified anyway.

4. Closed circuit grinding possesses an advantage over batch grinding in that the grinding is more efficient and a complete elimination of the coarse particles is effected with less grinding, a situation which always tends to give a product of greater whiteness. Furthermore, a certain amount of control can be employed to modify the properties such as oil absorption while operating at the same preferred critical size separation of 6 microns.

5. None of the commercial whitings listed in the U. S. Bureau of Mines Bulletin 395, match the characteristics of the product of this invention. All dry ground products are too coarse. All commercial wet ground products of satisfactory whiteness have about 40% by weight in a particle size range above 6 microns. Some of these wet ground products have a satisfactory oil absorption, i. e., about 20%, but when they are further ground as by laboratory wet ball milling the oil absorption becomes too great. All samples except three of dark colored chalks shown to have a particle size range essentially below 6 microns, have an oil absorption of 25% or greater.

As many apparently widely different embodiments of this invention may be made without departing from the spirit and scope thereof, it is to be understood that I do not limit myself to the specific embodiment except as defined in the appended claims.

Having described the present invention the following is claimed as new and useful:

1. A process for the production of finely divided calcium carbonate containing composite pigments having an oil absorption value of less than about 20 and substantially free of calcium carbonate particles larger than 6 microns which comprises subjecting calcium carbonate materials having a white light reflectance of at least 90% in admixture with calcined titanium oxide to wet grinding at a slurry concentration of between about 450 to about 550 grams of solids per liter, diluting the mill effluent to between about 225 and about 275 grams of solids per liter, centrifugally classifying to separate the fines and returning the coarse for further grinding.

2. A process for the production of finely divided composite pigments having an oil absorption value of less than about 20 and substantially free of calcium carbonate particles larger than 6 microns which comprises subjecting calcium carbonate materials having a white light reflectance of at least 90% in admixture with a calcined zinc sulfide pigment to continuous wet grinding at a slurry concentration of between about 450 to about 550 grams of solids per liter, diluting the mill effluent to between about 225 and about 275 grams of solids per liter, centrifugally classifying to separate the fines and returning the coarse for further grinding.

3. A process for the production of finely divided calcium carbonate containing composite pigments having an oil absorption value of less than about 20 and substantially free of calcium carbonate particles larger than 6 microns which comprises subjecting natural calcium carbonate materials having a white light reflectance of at least 90% in admixture with a calcined prime pigment to continuous wet grinding at a slurry concentration of between about 450 to about 550 grams of solids per liter, diluting the mill effluent to between about 225 and about 275 grams of solids per liter, centrifugally classifying to separate the fines and returning the coarse for further grinding.

4. A process for the production of finely divided calcium carbonate containing composite pigments having an oil absorption value of less than about 20 and substantially free of calcium carbonate particles larger than 6 microns which comprises subjecting minus about 4 mesh white calcium carbonate material having a white light reflectance of at least 90% in admixture with calcined titanium dioxide to the steps of wet ball mill grinding in a closed circuit at a slurry concentration of between about 450 to about 550 grams of solids per liter, diluting the mill effluent to between about 225 and about 275 grams of solids per liter, centrifugally classifying to separate the fines and returning the coarse for further grinding.

JAMES E. BOOGE.

CERTIFICATE OF CORRECTION.

Patent No. 2,260,826. October 28, 1941.

JAMES E. BOOGE.

It is hereby certified that error appears in the printed specification of the above numbered patent requiring correction as follows: Page 1, second column, line 41, for "power" read --powder--; and page 2, second column, line 15, for "mived" read --mixed--; and that the said Letters Patent should be read with this correction therein that the same may conform to the record of the case in the Patent Office.

Signed and sealed this 9th day of December, A. D. 1941.

(Seal)

Henry Van Arsdale,
Acting Commissioner of Patents.